(12) United States Patent
Palmieri

(10) Patent No.: US 8,441,712 B2
(45) Date of Patent: May 14, 2013

(54) SWITCHABLE DISPLAY SYSTEM

(75) Inventor: Michele Palmieri, Corvallis, OR (US)

(73) Assignee: STMicroelectronics, Inc., Coppell, TX (US)

( * ) Notice: Subject to any disclaimer, the term of this patent is extended or adjusted under 35 U.S.C. 154(b) by 278 days.

(21) Appl. No.: 12/925,181

(22) Filed: Oct. 15, 2010

(65) Prior Publication Data

US 2012/0092751 A1    Apr. 19, 2012

(51) Int. Cl.
*G02B 26/00* (2006.01)

(52) U.S. Cl.
USPC ........................................................ 359/296

(58) Field of Classification Search .................. 359/242, 359/243, 254, 291, 296
See application file for complete search history.

(56) References Cited

U.S. PATENT DOCUMENTS 7,722,190 B2 *   5/2010   Weng et al. ..................... 353/31

* cited by examiner

*Primary Examiner* — Joseph P Martinez
(74) *Attorney, Agent, or Firm* — Munck Wilson Mandala, LLP

(57) ABSTRACT

A display system for a portable device is switchable by electrical addressing. The display system can absorb ambient light and reflect at least a portion of the absorbed light to render an image on a surface of the display. The display includes a plurality of pixel electrodes. Each of the plurality of pixel electrodes includes linkers with acceptor molecules and donor molecules that form groups having respective color properties. In an off-state, a respective pixel is configured to reflect white light. In an on-state, a respective pixel is configured to reflect light according to the molecular grouping of the acceptor-donor group.

20 Claims, 4 Drawing Sheets

SWITCHABLE DISPLAY SYSTEM

TECHNICAL FIELD

The disclosure relates generally to display system, and in particular, to an electrically addressable color display system.

BACKGROUND

In the field of ambient illuminated, low-power, colored displays, an increasing number of technologies and systems have been proposed in recent years. The underlying technologies span from electrophoretic charged ink particles to nematic liquid crystal displays (LCD) to electro-wetting.

For example, an electrophoretic display uses charged ink (pigment) particles to form visible images. The charged ink particles are re-arranged using an applied electric field. Electrophoretic displays can be considered as electronic paper, because of their paper-like appearance and low power consumption.

Nematic displays include twisted nematic (TN) displays, super-twisted nematic (STN) displays and color super-twisted nematic (CSTN) displays. In a TN display, an electric field is applied to precisely control realignment of liquid crystal molecules between different ordered molecular configurations. This is achieved with little power consumption and at low operating voltages.

In electro-wetting, an electric field is applied to modify the wetting properties of a hydrophobic surface. Electro-wetting can be used in a wide range of applications from adjustable lenses to electronic displays (e-paper) and switches for optical fibers.

SUMMARY

A display system is provided. The display system includes a first electrode plate, a second electrode plate and an electrolyte disposed between the first electrode plate and the second electrode plate. The display system also includes a first linker coupled on a first end to the first electrode plate and having a negative charge disposed at a free end. The first linker includes a plurality of acceptor molecules disposed in proximity to a plurality of acceptor recognition sites. The display system also includes a second linker coupled on a first end to the second electrode plate and having a positive charge disposed at a free end. The second linker includes a plurality of donor molecules disposed in proximity to a plurality of donor recognition sites. The first linker and second linker are configured to vary in configuration such that the plurality of acceptor molecules and plurality of donor molecules are adjusted in proximity to each other.

A portable device is provided. The portable device includes a controller and a display. The display is configured to absorb ambient light and reflect at least a portion of the absorbed light to render an image on a surface of the display. The display includes a plurality of pixel electrodes. Each of the plurality of pixel electrodes includes respective color properties. The controller is configured to vary a voltage to respective ones of the plurality of pixel electrodes to cause portions of the display to reflect the absorbed light as colored light.

A method for operating a display is provided. The method includes addressing at least one pixel electrode by setting a configuration of acceptor and donor molecules in the pixel electrode in one of a grouped configuration and an ungrouped configuration. In the grouped configuration, an acceptor donor group is configured to absorb light in a given spectral region. The method also includes absorbing ambient light. The method further includes reflecting colored light when the acceptor and donor molecules are in the grouped configuration and white light when acceptor and donor molecules are in the ungrouped configuration.

Other technical features may be readily apparent to one skilled in the art from the following figures, descriptions and claims.

Before undertaking the DETAILED DESCRIPTION OF THE INVENTION below, it may be advantageous to set forth definitions of certain words and phrases used throughout this patent document. The term "packet" refers to any information-bearing communication signal, regardless of the format used for a particular communication signal. The terms "application," "program," and "routine" refer to one or more computer programs, sets of instructions, procedures, functions, objects, classes, instances, or related data adapted for implementation in a suitable computer language. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged display system.

The display system is an electronically addressable system whose optical properties can be reversibly switched and held at lower power consumption. The optical properties can be physical properties, electro-optical properties or electro-chemical properties.

Figure 1:
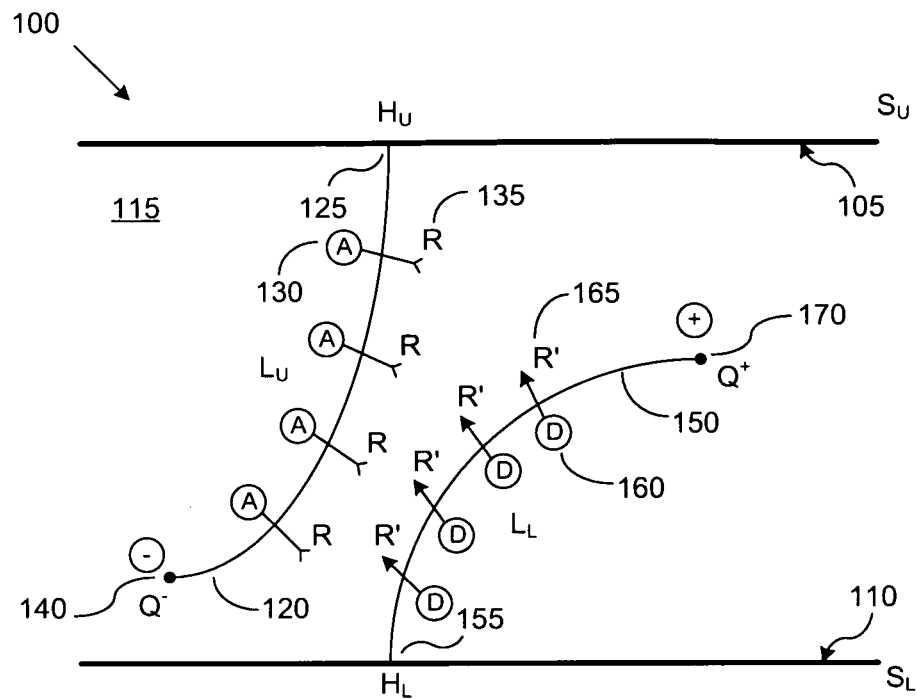
FIG. 1 illustrates a pixel electrode for an electrically addressable display system according to embodiments of the present disclosure.

FIG. 1 illustrates a pixel electrode in an electrically addressable display system according to embodiments of the present disclosure. The embodiment of the pixel electrode 100 shown in FIG. 1 is for illustration only. Other embodiments could be used without departing from the scope of this disclosure.

The pixel electrode 100 includes an upper transparent conductive plate configured as an electrode $S_U$ 105. A lower transparent conductive plate configured as an electrode $S_L$ 110 is disposed substantially parallel to the upper electrode $S_U$ 105. The lower electrode $S_L$ 110 can be disposed at a distance of $t_H$ from the upper electrode $S_U$ 105. The distance $t_H$ can be in the range of tenths to tens of microns. An electrolyte solution 115 is disposed between the upper electrode $S_U$ 105 and the lower electrode $S_L$ 110. The electrolyte solution can be any type of electrolyte solution as is known in the art.

A plurality of top acceptor polymeric chains, referred to as upper linkers $L_U$ 120, are grafted at point $H_U$ 125 to the inner side of upper electrode $S_U$ 105. The linkers $L_U$ 120 are dimensioned to be of a length l. The length l is in a range of one half $t_H$ to $t_H$ as shown in Equation 1:

$$\frac{t_H}{2} < l < t_H. \qquad [\text{Eqn. 1}]$$

A number (n) of acceptor molecules A 130 are attached to the linkers $L_U$ 120 at various locations. The acceptor molecules A 130 can be attached at substantially equal spacing along the linkers $L_U$ 120. A number (n) of specific locations on the linkers $L_U$ 120, disposed in proximity to respective ones of the acceptor molecules A 130, act as recognition sites (R) 135. A net negative charge ($Q^-$) is disposed at a free end 140 of the linkers $L_U$ 120.

A plurality of bottom donor polymeric chains, referred to as lower linkers $L_L$ 150, are grafted at point $H_L$ 155 to the inner side of the lower electrode $S_L$ 110. The linkers $L_L$ 150 are dimensioned to be of substantially the same length (l) as the linkers $L_U$ 120. A number (n) of donor molecules D 160 are attached to the linkers $L_L$ 150 at various locations. The donor molecules D 160 can be attached at substantially equal spacing along the linkers $L_L$ 150. The donor positions on linkers $L_L$ 150 can match acceptor positions on linkers $L_U$ 120. A number (n) of specific locations on the linkers $L_L$ 150, disposed in proximity to respective ones of the donor molecules D 160, act as recognition sites (R') 165. A net positive charge ($Q^+$) is disposed at a free end 170 of the linkers $L_L$ 150.

In the example illustrated in FIG. 1, NO voltage is applied to the pixel electrode 100 top electrode $S_U$ 105 and bottom electrode $S_L$ 110 and no pre-existing state is defined. By applying NO electric voltage to the system top electrode $S_U$ 105 and bottom electrode $S_L$ 110 and with no pre-existing state defined, a random distribution of the linkers $L_U$ 120 and $L_L$ 150 will occur, with some possible recognition pairs R-R' linked (that is, pairing of a first recognition site R 135 with a respective recognition site R' 165).

If a highly linked state pre-existed, the pixel electrode 100 can remain in the linked configuration even if NO voltage is supplied. This linked configuration can be stable over a long period of time, providing that the binding energy of the bound R-R' pairs is significantly higher than thermal energy at the given operating temperature.

Figure 2:
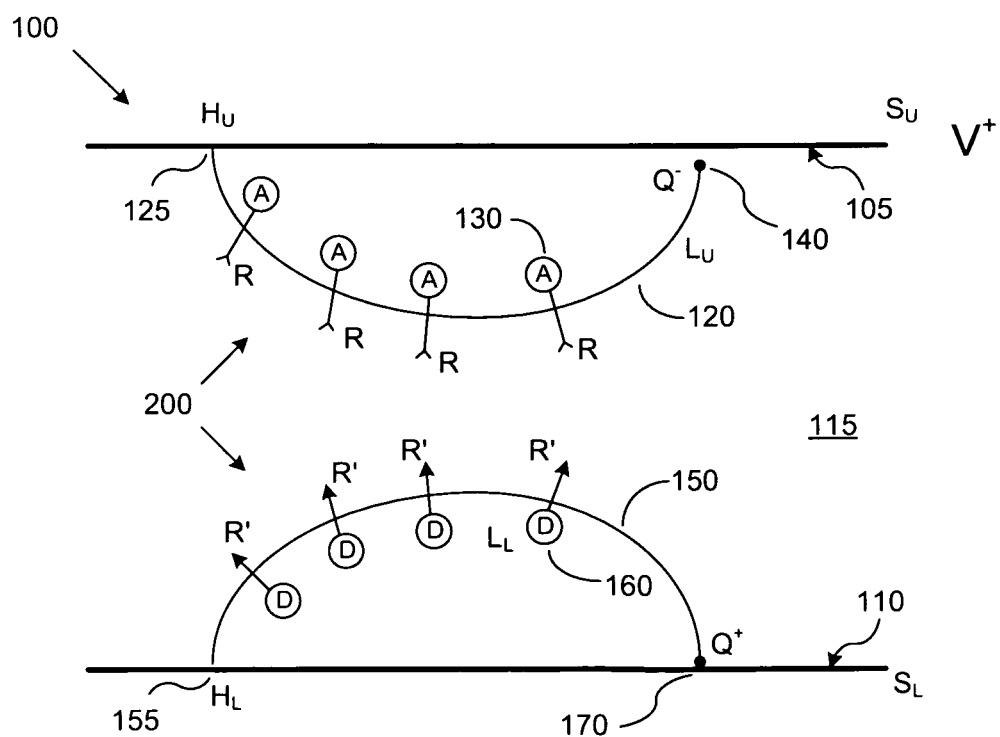
FIG. 2 illustrates the pixel electrode in an off state, curled and unbounded configuration according to embodiments of the present disclosure.

FIG. 2 illustrates the pixel electrode in an off state, curled and unbounded configuration according to embodiments of the present disclosure. The embodiment of the pixel electrode 100 shown in FIG. 2 is for illustration only. Other embodiments could be used without departing from the scope of this disclosure.

When a positive ($V^+$) voltage is applied to the upper electrode $S_U$ 105, electrostatic force develops across the electrolyte 115. The negative charge Q− at the end 140 of the upper linkers $L_U$ 120 is attracted toward the upper electrode $S_U$ 105 by the electrostatic force. At substantially the same time, the positive charge Q+ at the end 170 of the bottom linkers $L_L$ 150 is rejected by the upper electrode $S_U$ 105 towards the lower electrode $S_L$ 110.

In this state of the pixel electrode 100, the recognitions pairs R-R' are forced apart and are unable to interact. Therefore, no stable conjugate group A-D (e.g., conjugate pairing of acceptor molecule A 120 and donor 160) can form. Both upper linkers $L_U$ 120 and lower linkers $L_L$ 150 lay close to their respective plates in an un-bound, curled configuration 200.

Figure 3:
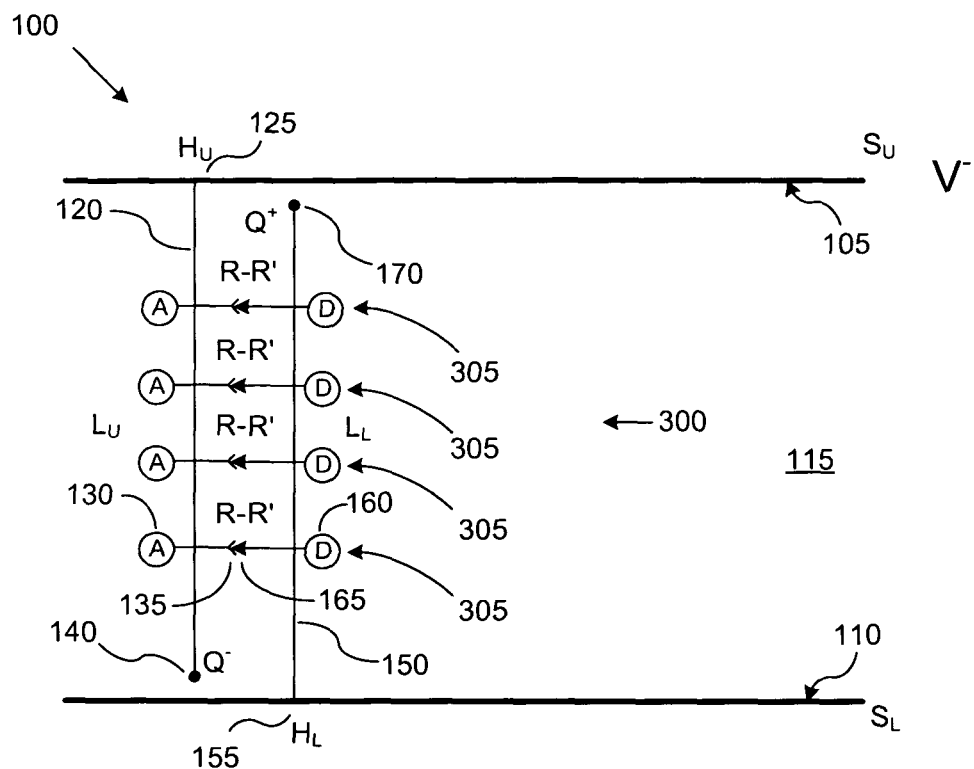
FIG. 3 illustrates the pixel electrode in an on state, linear, bound configuration according to embodiments of the present disclosure.

FIG. 3 illustrates the pixel electrode in an on state, linear, bound configuration according to embodiments of the present disclosure. The embodiment of the pixel electrode 100 in an on state, linear, bound configuration 300 shown in FIG. 3 is for illustration only. Other embodiments could be used without departing from the scope of this disclosure.

When a negative ($V^-$) voltage is supplied to the upper electrode $S_U$ 105, an electrostatic field is generated across the electrolyte 115. The electrostatic field pushes the negative charge $Q^-$, which is at the end 140 of the upper linkers $L_U$ 120, toward the lower electrode $S_L$ 110. Since the length of the upper linkers $L_U$ 120 is (l<$t_H$), the upper linkers $L_U$ 120 extend substantially perpendicular from the upper electrode $S_U$ 105, that is, the arrangement of the upper linkers $L_U$ 120 is a substantially linear configuration vertical to the planar electrodes 105, 110.

Similarly, the lower linkers $L_L$ 150, which bear a positive charge (Q+) at the free end 170, extend substantially perpendicular from the lower electrode $S_L$ 110. That is, the lower linkers $L_L$ 150 extend vertically toward the upper electrode $S_U$ 105 in a substantially linear configuration.

In this state, the recognition sites R 135 and R' 165 are able to interact. The recognition sites R 135 and R' 165 can bind to each other and form stable R-R' pairs. By virtue of these multiple affinity reactions, which tightly zip (e.g., couple) the upper linkers $L_U$ 120 to the lower linkers $L_L$ 150 at R-R' locations, the neighboring functional molecules A 130 and D 160 will come in close proximity (at an atomic scale), thus creating a supramolecular conjugate A-D group 305 at each recognition site.

Figure 4:
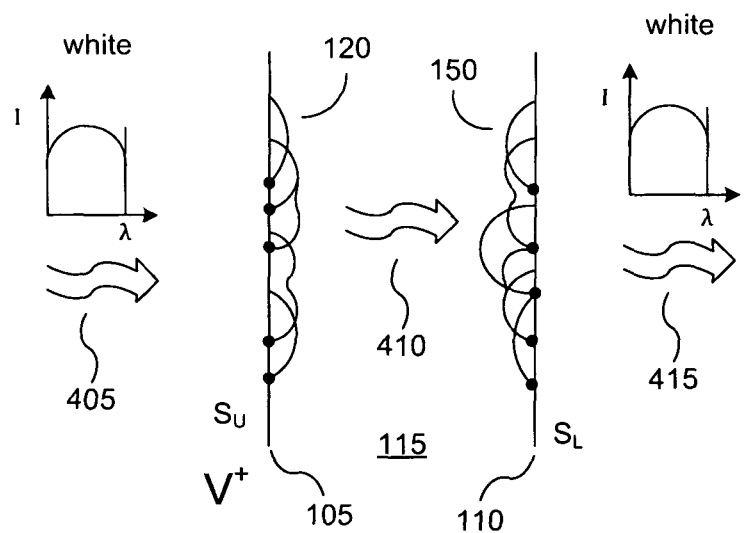
FIGS. 4 and 5 illustrate color display operations of the display system according to embodiments of the present disclosure.
Figure 5:
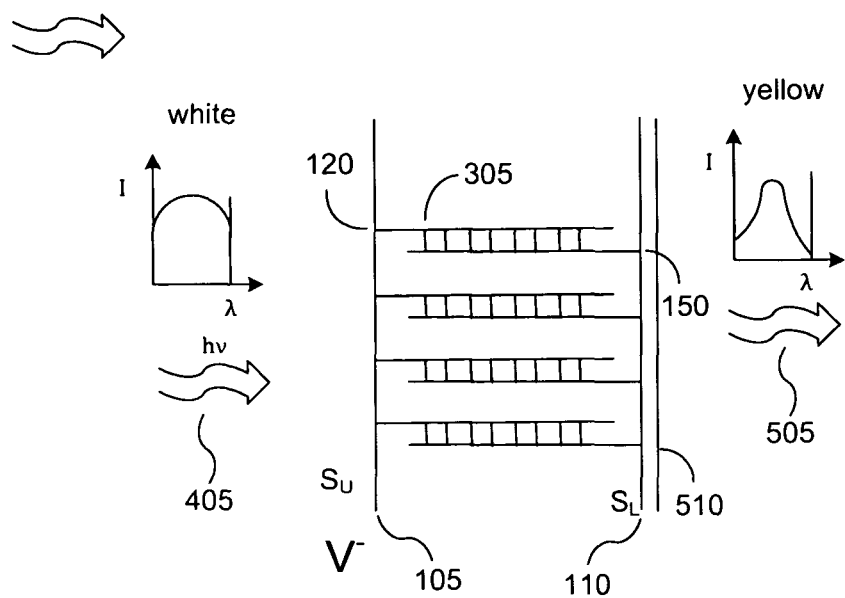

FIGS. 4 and 5 illustrate color display operations of the display system according to embodiments of the present disclosure. The embodiments of the operations shown in FIGS. 4 through 5 are for illustration only. Other embodiments could be used without departing from the scope if this disclosure.

In some embodiments, the supramolecular conjugate A-D groups 305 can be chosen to exhibit a variety of switchable physical, chemical, optical, and electrical properties. That is when A 130 and D 160 are far away, they illustrate the properties of the single A 130 and D 160 isolated molecules. However, when brought tightly close together at the atomic scale, the properties of the supramolecular conjugate A-D group 305 (pair) is markedly peculiar of the conjugated configuration.

In some embodiments, the display system can be irradiated by light energy hv. The molecule D 160 can act as an energy acceptor from the incoming photons and become an inter-molecular donor to the conjugated acceptor A 130. In turn, acceptor A 130 can re-emit a longer wave-length photon, or relax through molecular vibrational energy, or another form of energy.

Therefore, by properly designing A-D groups 305, the pixel electrode 100 can be configured such that the display system can be switched in a variety of forms.

In some embodiments, A-D groups 305 can be metal-porphyrine groups. It will be understood that illustration of the A-D groups 305 as metal-porphyrine groups is for example and explanation but that the A-D groups 305 can be other types of groups without departing from the scope of this disclosure. In a stand-alone configuration, metal-porphyrine groups have a given light absorption coefficient in a certain spectral region (a given color) while in the conjugated state the metal-porphyrine groups exhibit a shift in the absorption band-width (that is, color red-shifted to longer wave-length).

In some embodiments, the display system is configured as a low-power, ambient-illuminated color display.

The acceptor A 130 and donor D 160 molecular groups 305 can be selected such that when acceptor A 130 and donor D 160 stand alone and apart from each other, the acceptor A 130 and donor D 160 have very limited interaction with incident light. The incident light can be from a number of light sources including ambient sources such as from indoor or outdoor ambient illumination.

In the example shown in FIG. 4, the color display system is configured for a transparent state (white). When a respective pixel electrode 100 is electrically switched to the off-state, such as the un-bound configuration discussed in detail with respect to FIG. 2, the acceptor A 130 and donor D 160 are far apart. Therefore, the acceptor A 130 and donor D 160 stand alone characteristics dominate the Electrode-Electrolyte-Electrode cell (e.g., cell formed by the upper electrode $S_U$ 105, electrolyte 115 and the lower electrode $S_L$ 110).

For an observer located past the lower electrode $S_L$ 110, light is transmitted through the system with almost unchanged intensity and spectral distribution. However, realistically light intensity will be somewhat lower due to the non perfect transparency of the electrode substrate and conductive layer (Indium oxide doped with tin oxide (ITO), or the like) and electrolyte 115.

For example, an initial light 405 irradiates the display system. The initial light 405, at a wavelength for the color white, passes through the upper electrode $S_U$ 105 and the upper linkers $L_U$ 120, which lay close to the upper electrode $S_U$ 105 plate in an un-bound, curled configuration 200. The initial light 405 is substantially unaltered by the standalone characteristics of the acceptors A 130, producing the transit light 410. The transit light 410 may be substantially the same as the initial light 405, with a somewhat lower intensity. Thereafter, the transit light 410 passes through the lower linkers $L_L$ 150, which lay close to the lower electrode $S_L$ 110 plate in an un-bound, curled configuration 200, and through the lower electrode $S_L$ 110. The transit light 410 is substantially unaltered by the standalone characteristics of the donors D 160, producing the output light 415. The output light 415 may be substantially the same as the transit light 410, with a somewhat lower intensity. As such, the output light 415 also is at a wavelength for the color of white.

In the example shown in FIG. 5, the color display system is configured for an active state (colored). When acceptor A 130 and donor D 160 are close enough to enable inter-molecular interaction, as discussed in detail with respect to FIG. 3, the conjugated supra-molecular group A-D 305 is able to absorb light in a given spectral region with high quantum efficiency. Therefore, for the observer located past the lower electrode $S_L$ 110, the light from the pixel electrode 100 will now appear colored.

For example, an initial light 405 irradiates the display system. The initial light 405, at a wavelength for the color white, passes through the upper electrode $S_U$ 105. Since the pixel electrode 100 is in the on-state, the upper linkers $L_U$ 120 and the lower linkers $L_L$ 150 are substantially perpendicular to the upper electrode $S_U$ 105 and lower electrode $S_L$ 110, and the acceptors A 130 and donors D 160 each form a conjugated supra-molecular group A-D 305. The conjugated supra-molecular group A-D 305 absorbs the light in a given spectral region, such as yellow, with high quantum efficiency. Thereafter, the altered light passes through the lower electrode $S_L$ 110. The output light 505 may be substantially the same as the altered light, with a somewhat lower intensity. Therefore, the output light 505 is at a wavelength for the color of yellow. It will be understood that illustration of the output color as "yellow" is for example and explanation and that the molecular A-D group 305 can be configured to absorb other spectral regions without departing from the scope of this disclosure.

In some embodiments, for the upper electrode $S_U$ 105, either pattern or pixel electrodes, or both, are configured to be individually addressed electrically. In some embodiments, for the lower electrode $S_L$ 110, either pattern or pixel electrodes, or both, are configured to be individually addressed electrically. Therefore, by configuring either the pattern or pixel electrodes for one of the electrodes 105, 110, a system may be configured that is able to display images in a single color in transmission mode.

In some embodiments, a reflecting layer 510 can be placed underneath the lower electrode $S_L$ 110, and the system will become a reflective display. In some embodiments, the lower electrode $S_L$ 110 is made of, or includes, a reflecting material, and the system will become a reflective display. In some embodiments, a stack of different electrodes 105, 110, each with different A-D color properties, such as, Cyan-Magenta-Yellow or Red-Green-Blue triplets, can be combined to create a full color reflective display.

Figure 6:
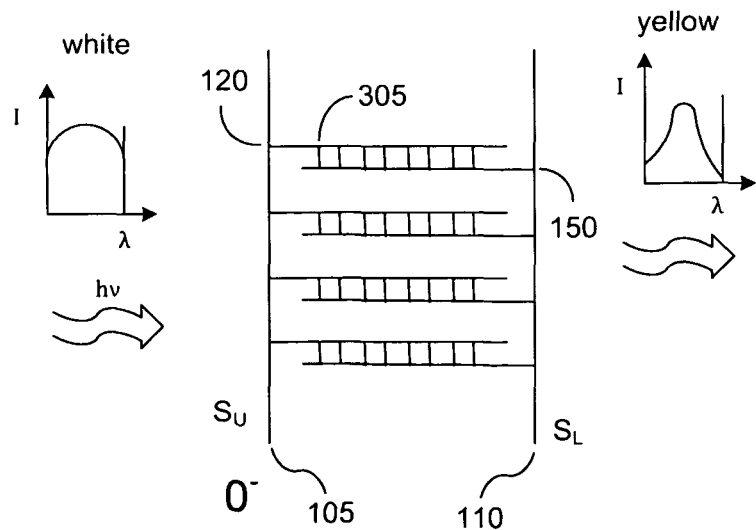
FIG. 6 illustrates a low power operation of the display system according to embodiments of the present disclosure.

FIG. 6 illustrates a low power operation of the display system according to embodiments of the present disclosure. The embodiment of the low power operations shown in FIG. 6 is for illustration only. Other embodiments could be used without departing from the scope if this disclosure.

In some embodiments, the display system is configured for low power consumption. Low power consumption is a very desirable attribute in a portable device.

The display system can be configured to utilize an external ambient illumination, similar to a printed paper. Therefore, there is no need for internal light source, which results is illumination power saving.

The display system is substantially bi-stable. For example, as illustrated in the hold state, colored example shown in FIG. 6, when the pixel electrode 100 is brought in the affinity reaction state (e.g., the on-state, bound described in detail with respect to FIGS. 3 and 5) by proper voltage, by lowering this voltage to nearly zero (e.g., $0^-$), the pixel electrode 100 can maintain its status, providing that the binding energy of the multiple R-R' pairs is higher than the operating temperature thermal energy.

Accordingly, only a very low power is necessary to operate the display system. For example, the voltage can be near zero (0⁻) after high voltage addressing. The very low power can be equal to the energy necessary to transition the charged linkers (upper linkers $L_U$ 120 and lower linkers $L_L$ 150) from the curled un-bound configuration into the linear bound configuration as shown in Equation 2:

$$W_{nec} = \frac{Q_{eq}^2}{C_{eq}} \times f_{op}. \quad [\text{Eqn. 2}]$$

In Equation 2, $W_{nec}$ is the necessary power requirement, Qeq and Ceq are the equivalent displacement charge and capacitance, and $f_{op}$ is the operation frequency.

Figure 7:
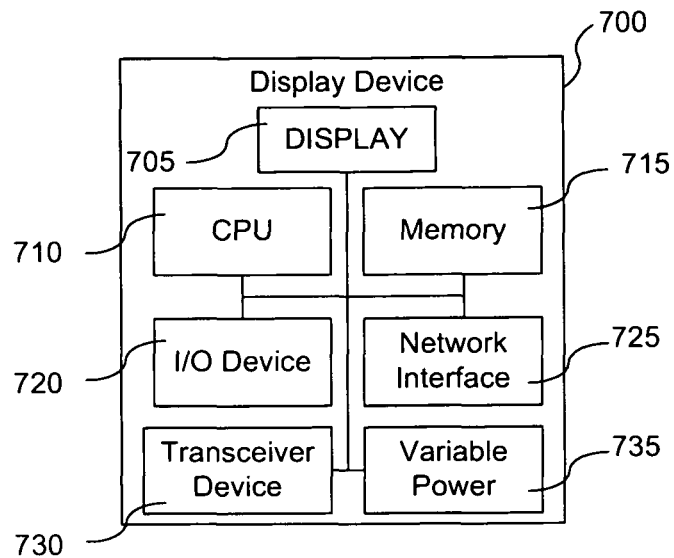
FIG. 7 illustrates a display device according to embodiments of the present disclosure.

FIG. 7 illustrates a display device according to embodiments of the present disclosure. The embodiment of the display device 700 shown in FIG. 7 is for illustration only. Other embodiments could be used without departing from the scope of this disclosure.

In some embodiments, the display device 700 is a portable device such as a mobile phone, a wireless laptop, a wireless portable data assistant (PDA), television, computer screen, or the like. In some embodiments, the display device 700 can be a display configured for use in the portable device.

The display device 700 includes the display system 705. The display system includes a plurality of pixel electrodes 100. The display device 700 also includes components such as a central processing unit ("CPU") 710 (e.g., a processor or special purpose controller), a memory unit 715, and an input/output ("I/O") device 720. The display device 700 can also include a network interface 725, a transceiver device 730, a variable voltage source 735, or combination thereof. It is understood that the display device 700 may be differently configured and that each of the listed components may actually represent several different components. For example, the CPU 710 may actually represent a multi-processor or a distributed processing system; the memory unit 715 may include different levels of cache memory, main memory, hard disks, and remote storage locations; and the I/O device 720 may include monitors, keyboards, and the like. The network interface 725 enables the display device 700 to connect to a network. The transceiver device 730 can include a plurality of transmission antennas configured to transmit data via a wireless communication medium and a plurality of receiving antennas configured to receive data from a wireless communications medium. In some embodiments, the transceiver device 730 includes transmitters and/or receivers configured to communicate data via an infrared medium, wireless fidelity (wifi) medium, and an acoustic medium.

The CPU 710 is configured to alter a configuration of respective pixel electrodes 100 to vary a color or image displayed on a surface of the display system 705. Accordingly, CPU 710 is configured to cause the variable voltage source 735 to provide a voltage to portions of the display system to vary a state of the pixel electrodes 100 and a corresponding configuration of the linkers 120, 150.

Figure 8:
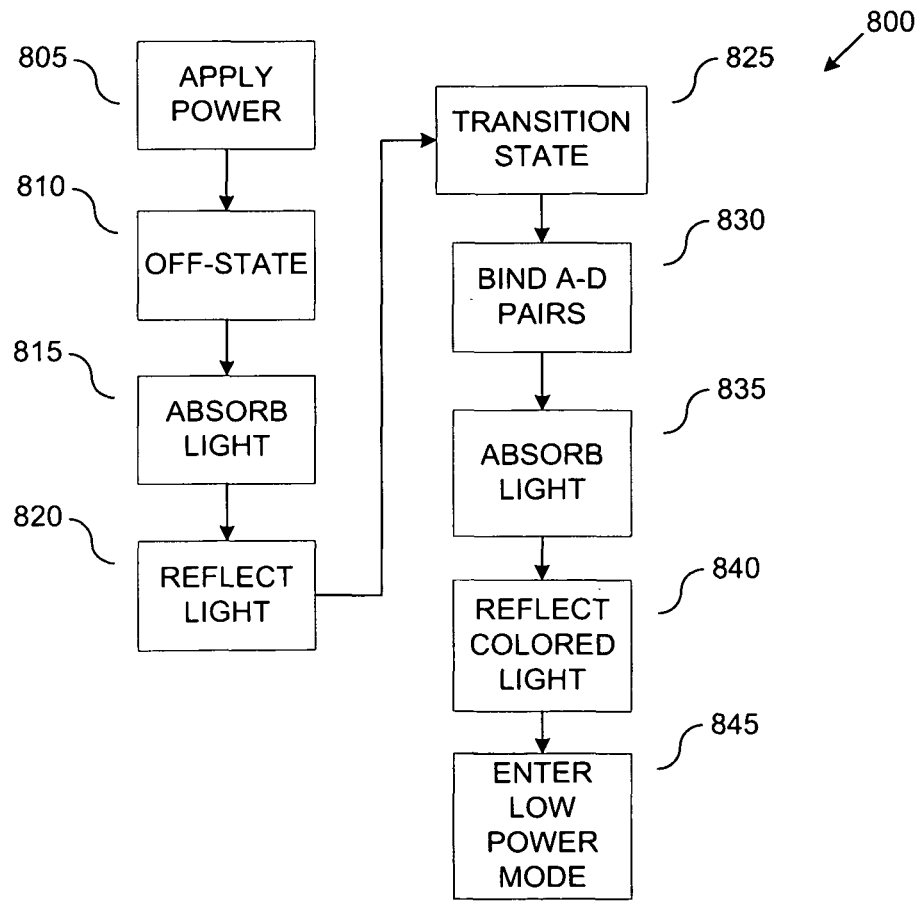
FIG. 8 illustrates a process for operating a display according to embodiments of the present disclosure.

FIG. 8 illustrates a process for operating a display according to embodiments of the present disclosure. The embodiment of the process 800 shown in FIG. 8 is for illustration only. Other embodiments could be used without departing from the scope of this disclosure.

In block 805, power is applied to the display system. Respective pixels in the display system are in an off-state in block 810. In the off-state, the linkers are curled and the acceptors and donors are unbound. Furthermore, in the off-state, ambient light is absorbed in block 815. The light is reflected back in block 820. In block 825, respective pixels of the display system are transitioned to an on-state. The pixels (portions of the display) activated can be specified by electrical addressing. As the pixels are activated, in block 830 the linkers are extended towards an opposite electrode plate and acceptors and donors bind in pairs. The pixels activated and resultant molecular A-D group formed by the bound acceptors and donors can include characteristics to absorb light in a given spectral region with high quantum efficiency. In block 835, ambient light is absorbed through the molecular A-D groups and reflected back through the molecular A-D groups in block 840. In block 845, power is reduced to one or more pixels, and the display operates in a color hold configuration.

Although the figures above illustrate specific systems, structures, and methods, various changes may be made to the figures. For example, various components in the systems and structures can be combined, omitted, further subdivided, or moved according to particular needs. Also, while shown as a series of blocks, various blocks in FIG. 8 could overlap, occur in parallel, or occur multiple times.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A display system comprising:
a first electrode plate;
a second electrode plate;
an electrolyte disposed between the first electrode plate and the second electrode plate;
a first linker coupled on a first end to the first electrode plate and having a negative charge disposed at a free end, the first linker comprising a plurality of acceptor molecules disposed in proximity to a plurality of acceptor recognition sites; and
a second linker coupled on a first end to the second electrode plate and having a positive charge disposed at a free end, the second linker comprising a plurality of donor molecules disposed in proximity to a plurality of donor recognition sites,
wherein the first linker and second linker are configured to vary in configuration such that the plurality of acceptor molecules and plurality of donor molecules are adjusted in proximity to each other.

2. The display system according to claim 1, wherein first linker and second linker are configured to be in a curled configuration in response to a positive voltage applied to the first electrode plate, and wherein the plurality of acceptor molecules and plurality of donor molecules are unbound.

3. The display system according to claim 1, wherein first linker and second linker are configured to extend substantially perpendicular from a planar surface of the first electrode plate and second electrode plate in response to a negative voltage applied to the first electrode plate, and
wherein the plurality of acceptor recognition sites are configured to bind to the plurality of donor recognition sites such that the plurality of acceptor molecules and plurality of donors molecules form a plurality of molecular groups.

4. The display system according to claim 3, wherein the molecular groups are configured to absorb light in a given spectral region.

5. The display system according to claim 3, wherein the plurality of acceptor recognition sites and the plurality of donor recognition sites are configured to remain bound when the voltage applied to the first electrode is reduced to substantially zero volts.

6. The display system according to claim 1, wherein the second electrode plate is disposed substantially parallel and at a distance of $t_H$ from the first electrode plate, and wherein each of the linkers is dimensioned to have a length (l) in the range of $$\frac{t_H}{2} < 1 < t_H.$$

7. The display system according to claim 1, wherein the first and second linkers comprise polymeric chains.

8. The display system according to claim 1, further comprising a reflective surface, the reflective surface comprising one of:
- a reflective layer disposed adjacent to the second electrode plate; and
- the second electrode comprising a reflective material.

9. A portable device comprising:
a controller; and
a display configured to absorb ambient light and reflect at least a portion of the absorbed light to render an image on a surface of the display, the display comprising a plurality of pixel electrodes, each of the plurality of pixel electrodes comprising respective color properties, each pixel electrode comprising:
a first electrode plate,
a second electrode plate,
an electrolyte disposed between the first electrode plate and the second electrode plate,
a first linker coupled on a first end to the first electrode plate and having a negative charge disposed at a free end, the first linker comprising a plurality of acceptor molecules disposed in proximity to a plurality of acceptor recognition sites, and
a second linker coupled on a first end to the second electrode plate and having a positive charge disposed at a free end, the second linker comprising a plurality of donor molecules disposed in proximity to a plurality of donor recognition sites,
wherein the first linker and second linker are configured to vary in configuration such that the plurality of acceptor molecules and plurality of donor molecules are adjusted in proximity to each other,
wherein the controller is configured to vary a voltage to respective ones of the plurality of pixel electrodes to cause portions of the display to reflect the absorbed light as colored light.

10. The portable device according to claim 9, wherein first linker and second linker are configured to be in a curled configuration in response to a positive voltage applied to the first electrode plate, and wherein the plurality of acceptor molecules and plurality of donor molecules are unbound.

11. The portable device according to claim 9, wherein first linker and second linker are configured to extend substantially perpendicular from a planar surface of the first electrode plate and second electrode plate in response to a negative voltage applied to the first electrode plate, and wherein the plurality of acceptor recognition sites are configured to bind to the plurality of donor recognition sites such that the plurality of acceptor molecules and plurality of donors molecules form a plurality of molecular groups.

12. The portable device according to claim 11, wherein the molecular groups are configured to absorb light in a given spectral region.

13. The portable device according to claim 11, wherein the plurality of acceptor recognition sites and the plurality of donor recognition sites are configured to remain bound when the voltage applied to the first electrode is reduced to substantially zero volts.

14. The portable device according to claim 9, wherein the second electrode plate is disposed substantially parallel and at a distance of $t_H$ from the first electrode plate, and wherein each of the linkers is dimensioned to have a length (1) in the range of $$\frac{t_H}{2} < 1 < t_H.$$

15. The portable device according to claim 9, wherein the first and second linkers comprise polymeric chains.

16. The portable device according to claim 9, further comprising a reflective surface, the reflective surface comprising one of:
- a reflective layer disposed adjacent to the second electrode plate; and
- the second electrode comprising a reflective material.

17. A method for operating a display, the method comprising:
addressing at least one pixel electrode by setting a configuration of acceptor and donor molecules in the pixel electrode in one of a grouped configuration and an ungrouped configuration, wherein when in the grouped configuration, an acceptor donor group is configured to absorb light in a given spectral region;
absorbing ambient light; and
reflecting at least one of:
colored light when in the acceptor and donor molecules are in the grouped configuration, and
white light when acceptor and donor molecules are in the ungrouped configuration.

18. The method according to claim 17, wherein addressing comprises:
applying a voltage to a first electrode plate of the pixel electrode such that:
a first polymeric chain extends from the first electrode plate in a linear configuration and a second polymeric chain extends from a second electrode plate in a linear configuration when a negative voltage is applied to the first electrode plate; and
each of the first polymeric chain and second polymeric chain comprises a curled configuration when a positive voltage is applied to the first electrode plate, wherein the first polymeric chain comprises a plurality of acceptor molecules and the second polymeric chain comprises a plurality of donor molecules.

19. The method of claim 18, wherein addressing further comprises reducing a voltage to a substantially zero level after applying a negative voltage to the first electrode plate.

20. The method according to claim 17, wherein addressing comprises:
applying a voltage to a first electrode plate of the pixel electrode such that:
a first polymeric chain and a second polymeric chain extend substantially perpendicular from a planar surface of the first electrode plate and second electrode plate when a negative voltage is applied to the first electrode plate; and
the first polymeric chain comprises a plurality of acceptor molecules disposed in proximity to a plurality of acceptor recognition sites, the second polymeric chain comprises a plurality of donor molecules disposed in proximity to a plurality of donor recognition sites, and
the plurality of acceptor recognition sites are configured to bind to the plurality of donor recognition sites such that the plurality of acceptor molecules and plurality of donors molecules form a plurality of molecular groups.

\* \* \* \* \*